(12) United States Patent
Lai

(10) Patent No.: US 8,608,118 B2
(45) Date of Patent: Dec. 17, 2013

(54) CLAMPING DEVICE FOR A TELESCOPIC ROD

(75) Inventor: Hsin-Yuan Lai, Taichung (TW)

(73) Assignee: Hsin-Yuan Lai, Taichung (TW)

( * ) Notice: Subject to any disclaimer, the term of this patent is extended or adjusted under 35 U.S.C. 154(b) by 0 days.

(21) Appl. No.: 13/466,355

(22) Filed: May 8, 2012

(65) Prior Publication Data

US 2013/0111712 A1    May 9, 2013

(51) Int. Cl.
*F16L 3/08* (2006.01)
*F16L 1/12* (2006.01)

(52) U.S. Cl.
USPC ..... 248/74.3; 348/74.1; 348/74.2; 403/322.4; 403/374.2; 403/374.5

(58) Field of Classification Search
CPC ...................................... F16L 3/08; F16L 3/12
USPC .................. 248/74.1, 74.2, 74.3, 214, 228.2, 248/229.21; 403/109.5, 322.4, 377, 374.2, 403/374.5
See application file for complete search history.

(56) References Cited

U.S. PATENT DOCUMENTS

| | | | | |
|---|---|---|---|---|
| 3,305,234 A * | 2/1967 | Cline et al. | ..................... | 482/107 |
| 4,405,107 A * | 9/1983 | Clyburn | ..................... | 248/230.4 |
| 4,405,251 A * | 9/1983 | Kolchinsky et al. | ............... | 403/9 |
| 4,497,092 A * | 2/1985 | Hoshino | ......................... | 24/514 |
| 4,596,484 A * | 6/1986 | Nakatani | ....................... | 403/104 |
| 4,643,460 A * | 2/1987 | Lieberg | ......................... | 285/112 |
| 4,744,690 A * | 5/1988 | Hsieh | ............................ | 403/104 |
| 4,868,927 A * | 9/1989 | Bourdeau et al. | .............. | 2/161.1 |
| 6,142,699 A * | 11/2000 | Pao | ............................ | 403/109.5 |
| 6,155,743 A * | 12/2000 | Chen | .......................... | 403/374.1 |
| 6,234,277 B1 * | 5/2001 | Kaczmarek | ................... | 187/414 |
| 6,578,804 B2 * | 6/2003 | Lin et al. | ..................... | 248/188.7 |
| 6,874,627 B2 * | 4/2005 | Maeng | ........................ | 206/315.2 |
| 6,908,249 B2 * | 6/2005 | Tomm | ........................ | 403/109.1 |
| 6,948,878 B1 * | 9/2005 | Smith et al. | .................. | 403/110 |
| 6,972,042 B2 * | 12/2005 | Benson | .......................... | 623/38 |
| 7,484,493 B2 * | 2/2009 | Bischofberger et al. | ... | 123/193.3 |
| 8,006,711 B2 * | 8/2011 | Pietrzak et al. | ................. | 135/75 |
| 8,132,355 B1 * | 3/2012 | Kincaid et al. | .................. | 42/124 |
| 8,256,983 B2 * | 9/2012 | Lin | ............................ | 403/322.4 |
| 2007/0138351 A1 * | 6/2007 | Wu | ................................ | 248/74.2 |
| 2011/0240078 A1 * | 10/2011 | Lenhart et al. | .................. | 135/75 |

* cited by examiner

*Primary Examiner* — Nkeisha Smith
(74) *Attorney, Agent, or Firm* — Pillsbury Winthrop Shaw Pittman LLP

(57) ABSTRACT

A clamping device includes a flexible sleeve secured to one segment of a telescopic rod and having a collar for receiving the other segment, and two lugs displaceable between untightened and tightened positions, and an elastic lining member disposed on the collar such that, as a result of displacement of the lugs from the untightened position to the tightened position, the elastic lining member is strained to acquire a biasing force that biases the lugs back toward the untightened position, thereby facilitating telescopic movement of the telescopic rod during length-adjustment.

6 Claims, 9 Drawing Sheets

CLAMPING DEVICE FOR A TELESCOPIC ROD

BACKGROUND OF THE INVENTION

1. Field of the Invention

This invention relates to a telescopic rod, more particularly to a clamping device for clamping two segments of a telescopic rod.

2. Description of the Related Art

Referring to FIGS. 1 and 2, a conventional clamping device for a length-adjustable pole as disclosed in U.S. Publication No. 2011/0240078 A1 is shown to include a flexible sleeve 1 having a collar 101 which is secured to one segment of a telescopic rod, and a pair of lugs 102, 104 defining a gap 103 therebetween. A bolt 2 has a threaded stem extending through the lugs 102, 104 to engage a screw nut 4. A washer 3 is sleeved on a head of the bolt 2. A lever arm 5 is pivotably connected to the head about a hinge axis 501, and has a cam surface 502 to be in abutting engagement with the washer 3. Upon turning of the lever arm 5, by virtue of a camming action between the cam surface 502 and the washer 3, the lugs 102, 104 are displaced between clamped and unclamped positions.

Since the lugs 102, 104 are usually retained in the tightened position and may be deformed due to material fatigue after long-term use, the lugs 102, 104 may not be biased away from each other when the lever arm 3 is turned to the untightened position, which adversely affects the length-adjustment of the telescopic rod.

SUMMARY OF THE INVENTION

An object of the present invention is to provide a clamping device which can prevent malfunction in clamping caused by fatigue of a flexible sleeve thereof to thereby ensure smoothness of a length-adjustment of a telescopic rod.

According to this invention, the clamping device includes a flexible sleeve adapted to be secured on a joint end of an outer segment of a telescopic rod, and having a collar which has a grasping surface that circumscribes an axially extending bore along the longitudinal axis for receiving a joint end of an inner segment of the telescopic rod, and which has a gap that extends axially and that is communicated with the axially extending bore to define two opposite side edges, and first and second lugs which respectively extend from the side edges in a first transverse direction, and which are spaced apart from each other in a second transverse direction. The first and second lugs are displaceable in the second transverse direction between untightened and tightened positions where the gap has larger and smaller clearances, respectively. An elastic lining member is made from a material with a higher elasticity than that of the collar, and has a base lining segment which is disposed on the collar and in intimate contact with the grasping surface, and which is diametrically opposite to the gap relative to the longitudinal axis, and two curved flanking segments which respectively and angularly extend from two lateral edges of the base lining segment about the longitudinal axis, and which are in intimate contact with the grasping surface. As a result of displacement of each of the first and second lugs from the untightened position to the tightened position, each of the curved flanking segments is strained so as to acquire a biasing force that biases each of the curved flanking segments back toward the untightened position. A tightening unit has a bolt member which extends through the first and second lugs along a transverse axis in the second transverse direction, and a lever member which is pivotally connected to the bolt member about a hinge axis parallel to the longitudinal axis and which has a camming surface that is configured to be angularly displaced upon turning of the lever arm about the hinge axis so as to press the first lug to move toward the second lug by virtue of camming action of the camming surface, thereby displacing the first and second lugs to the tightened position.

By provision of the elastic lining member which acquires a biasing force when the first and second lugs are in the tightened position, the first and second lugs can be urged away from each other once the tightening force by virtue of the camming action of the camming surface is released, and can be smoothly displaced back to the untightened position. Furthermore, the first and second lugs will not easily become fatigue with prolonged use.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
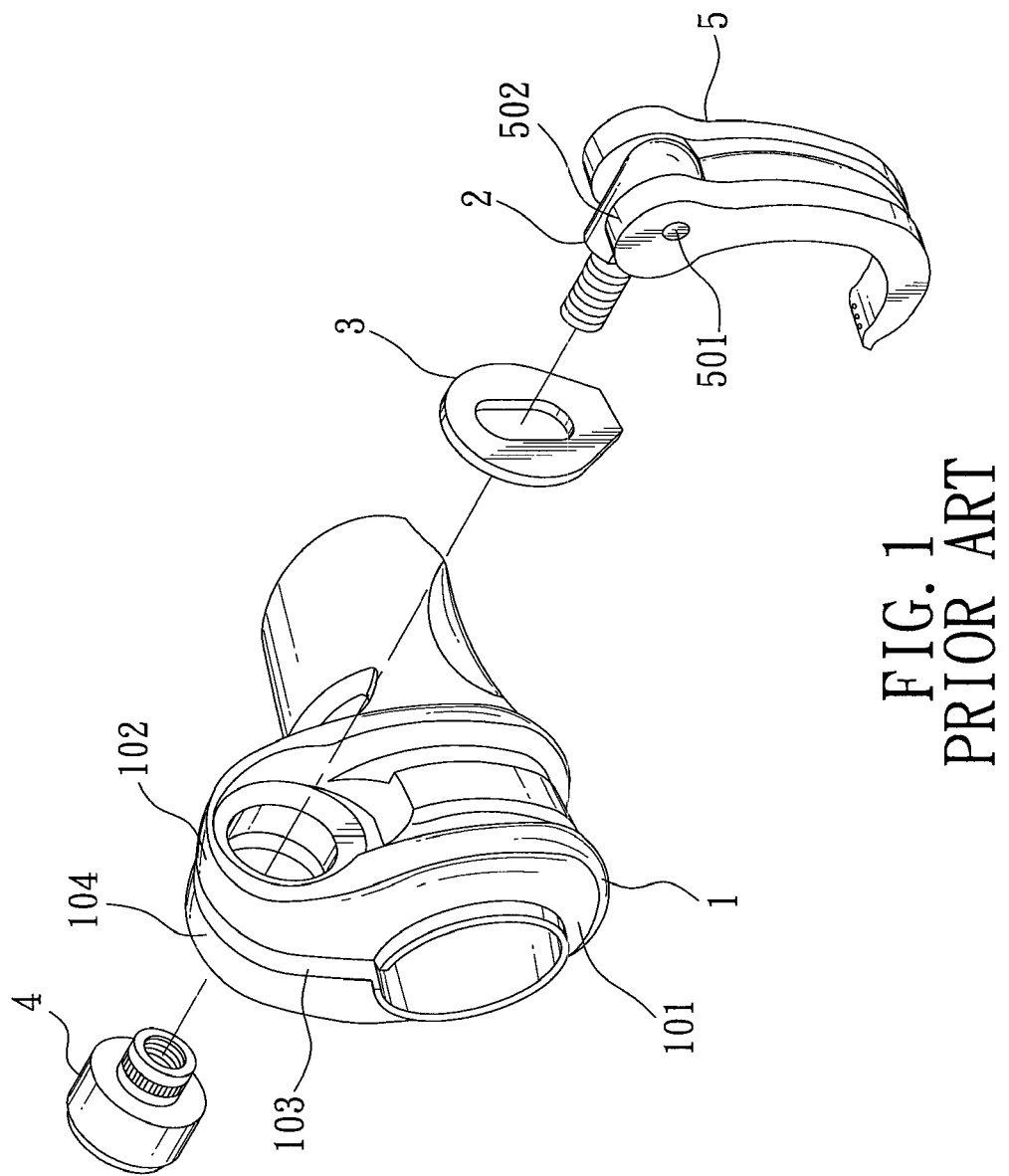
FIG. 1 is an exploded perspective view of a conventional clamping device disclosed in U.S. Publication No. 2011/0240078 A1.
Figure 2:
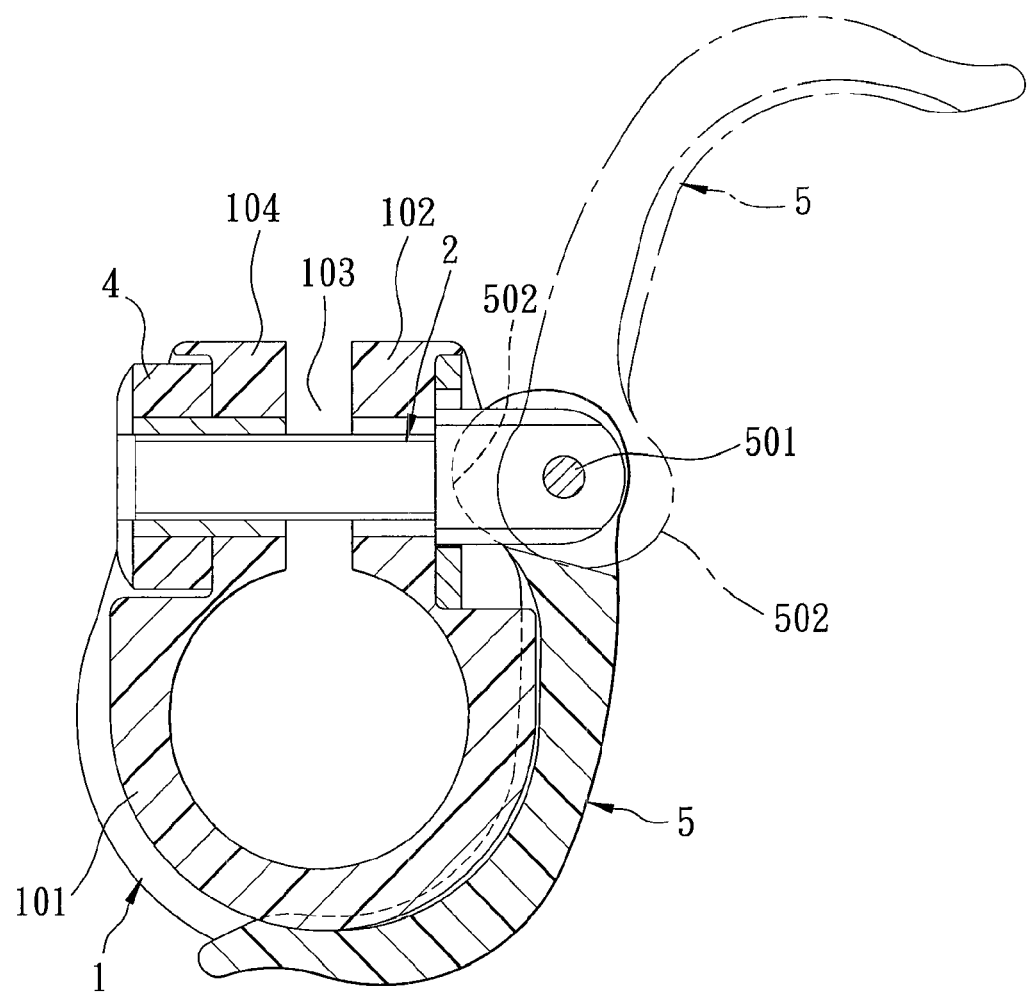
FIG. 2 is a sectional view of the conventional clamping device.

Before the present invention is described in greater detail, it should be noted that same reference numerals have been used to denote like elements throughout the specification.

Figure 3:
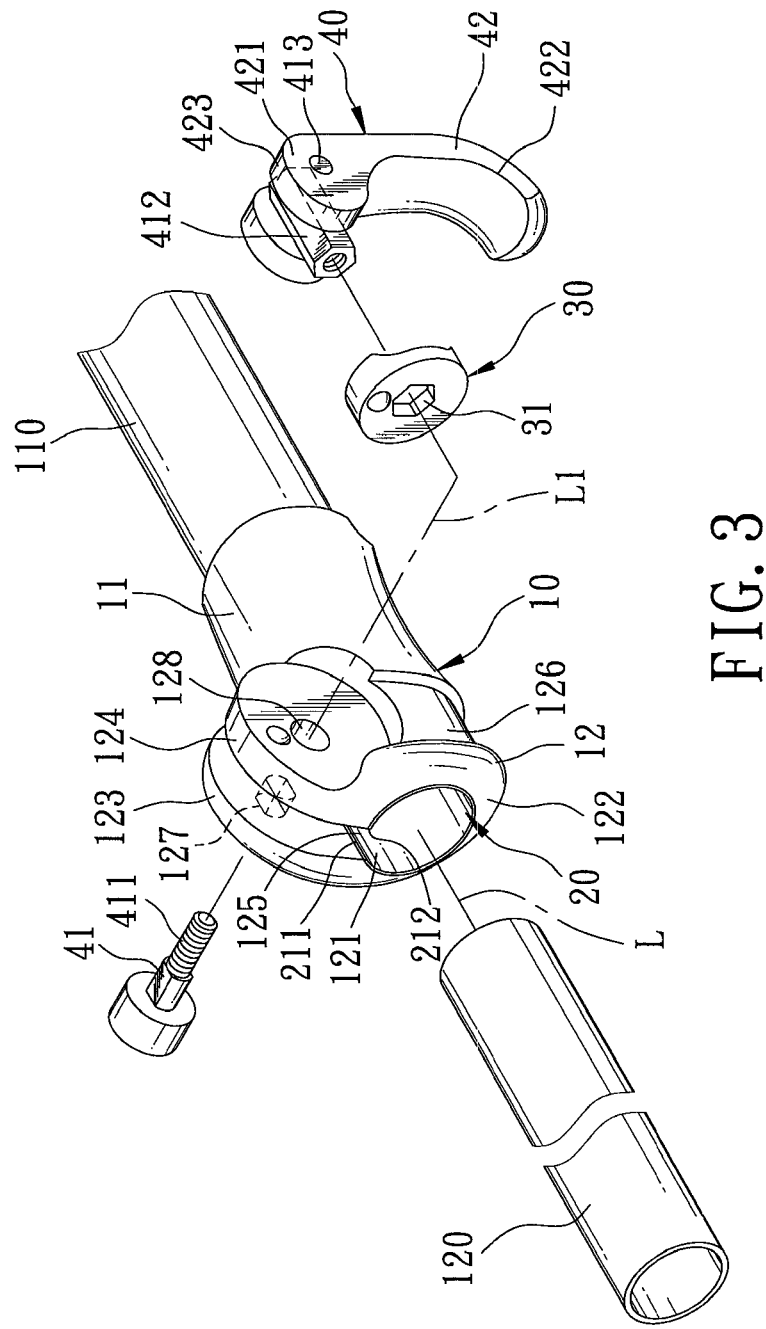
FIG. 3 is an exploded perspective view of a first embodiment of a clamping device according to this invention.
Figure 4:
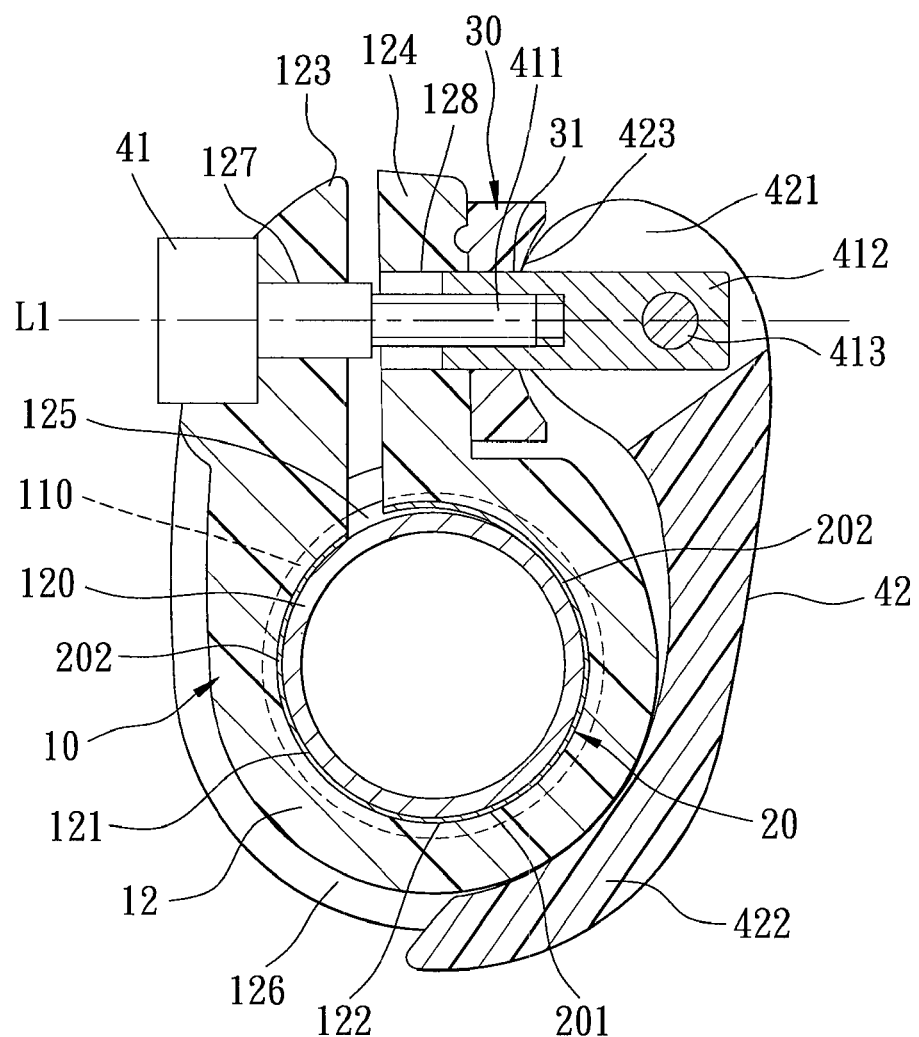
FIG. 4 is a sectional view of the first embodiment in a tightened state.

Referring to FIGS. 3 and 4, a first embodiment of a clamping device according to the present invention is shown to be mounted at the joint ends of outer and inner segments 110, 120 of a telescopic rod that are telescopically fitted to each other along a longitudinal axis (L). The clamping device comprises a flexible sleeve 10, an elastic lining member 20, a tightening washer 30, and a tightening unit 40.

The flexible sleeve 10 has a mount portion 11 adapted to be secured on the joint end of the outer segment 110, a collar 12 which has a grasping surface 122 that circumscribes an axially extending bore 121 along the longitudinal axis (L) for receiving the joint end of the inner segment 120, and which has a gap 125 that extends axially and that is communicated with the axially extending bore 121 to define two opposite side edges, and first and second lugs 123, 124 which respectively extend from the side edges in a first transverse direction relative to the longitudinal axis (L), and which are spaced apart from each other in a second transverse direction that is transverse to both the first transverse direction and the longitudinal axis (L). By means of its flexibility of the sleeve 10, the first and second lugs 123, 124 are displaceable in the second transverse direction between untightened and tightened positions where the gap 125 has larger and smaller clearances, respectively. Further, the flexible sleeve 10 has an encircling depression 126 formed in the collar 12, a non-circular spline hole 127 formed in the first lug 123, and a penetrating hole 128 which is formed in the second lug 124 and which is aligned with the spline hole 127 along a transverse axis (L1) in the second transverse direction.

The elastic lining member 20 is made from a thin metal sheet with a higher elasticity than that of the collar 12, and has a base lining segment 201 which is disposed on the collar 12 and in intimate contact with the grasping surface 122, and which is diametrically opposite to the gap 125 relative to the longitudinal axis (L), and two curved flanking segments 202 which respectively and angularly extend from two lateral edges of the base lining segment 201 about the longitudinal axis (L), and which are in intimate contact with the grasping surface 122. Specifically, the elastic lining member 20 may be made from a thin metal sheet which is curved to form as the curved flanking segments 202 when being disposed on the collar 12. The curved flanking segments 202 extend angularly to terminate at two end edges 211, 212, respectively, which are disposed adjacent to the side edges of the collar 12, respectively. Thus, as a result of displacement of each of the first and second lugs 123, 124 from the untightened position to the tightened position, each of the curved flanking segments 202 is strained so as to acquire a biasing force that biases each of the curved flanking segments 202 back toward the untightened position.

The tightening washer 30 is disposed outboard of the second lug 124, and has a non-circular fit hole 31 which is aligned with the penetrating hole 128.

The tightening unit 40 has a bolt member 41 which extends through the spline hole 127, the penetrating hole 128, and the fit hole 31 along the transverse axis (L1), and a lever member 42 which is pivotally connected to the bolt member 41 by a hinge pin 413 about a hinge axis parallel to the longitudinal axis (L). In particular, the bolt member 41 is in spine engagement with the spline hole 127, and has a threaded segment 411 and a threaded coupler 412 which non-rotatably and fittingly extends through the fit hole 31 to be threadedly engaged with the threaded segment 411. Thus, a screw-in movement of the threaded coupler 412 is translated into a linear displacement of the threaded segment 411 along the transverse axis (L1). The lever member 42 has a pivoted segment 421 which is pivotally connected to the threaded coupler 412, and which has a camming surface 423, and an arm segment 422 extending radially and angularly from the pivoted segment 421 for manual operation.

As shown in FIG. 4, the flexible sleeve 10 is illustrated to be in the tightened position where the inner segment 120 is firmly retained with the outer segment 110. In the tightened position, the arm segment 422 is located in the encircling depression 126, and the camming surface 423 is in friction engagement with the tightening washer 30 so as to displace the first and second lugs 123, 124 toward each other, thereby reducing the clearance of the gap. Meanwhile, the curved flanking segments 202 are strained to acquire a biasing force that can bias the curved flanking segments 202 away from each other.

Figure 5:
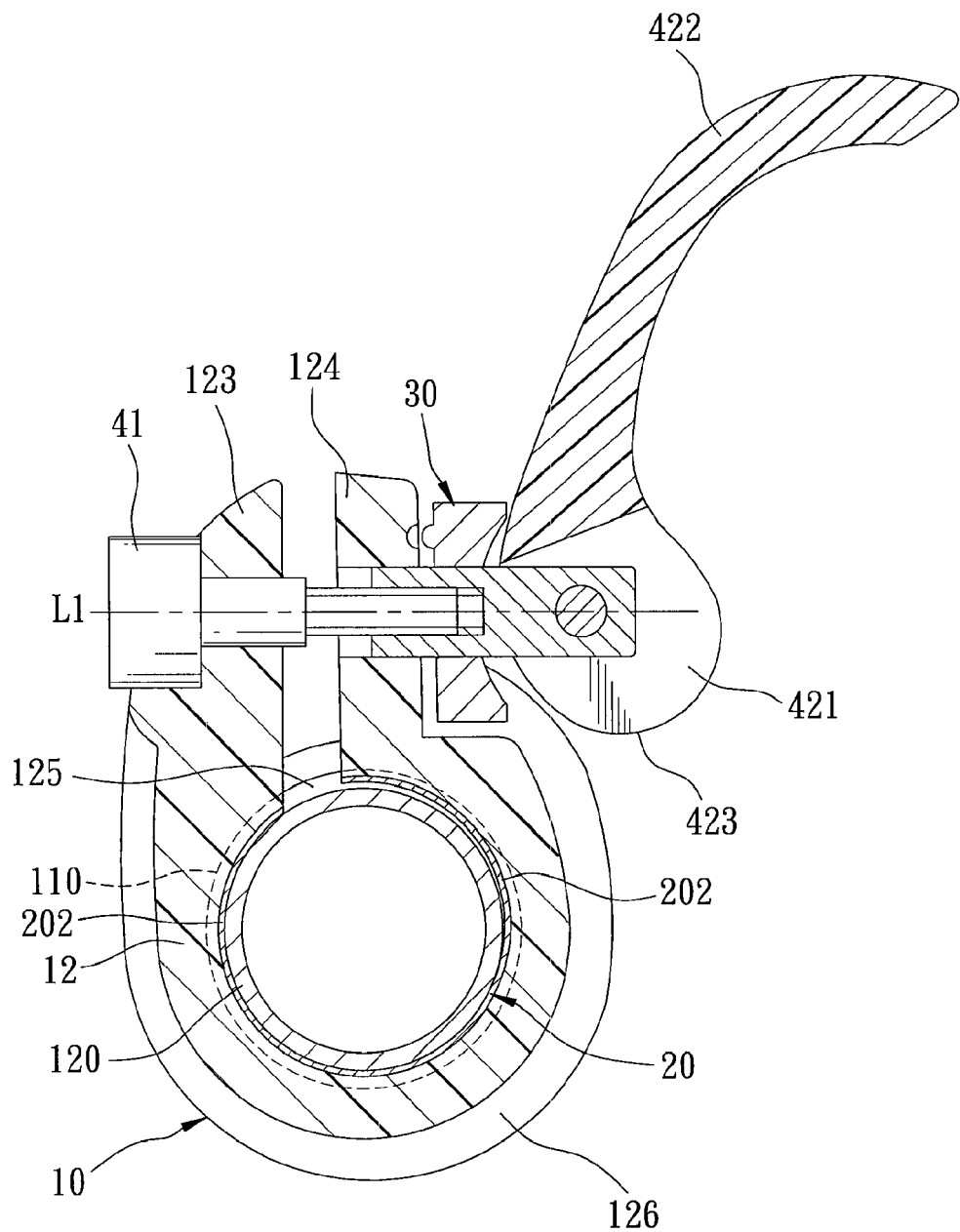
FIG. 5 is a sectional view of the first embodiment in an untightened state.

As shown in FIG. 5, when the pivoted segment 421 is displaced by turning of the arm segment 422 away from the encircling depression 126, the tightening washer 30 is untightened to permit the second lug 124 to be displaced to the untightened position. By the biasing force of the curved flanking segment 202, the first and second lugs 123, 124 can be displaced successfully back to the untightened position so as to avoid hindering from telescopic movement of the inner segment 120 relative to the outer segment 110 for length-adjustment of the telescopic rod.

Accordingly, by provision of the elastic lining member 20 which acquires a biasing force when the first and second lugs 123, 124 are in the tightened position, the first and second lugs 123, 124 can be urged away from each other once the tightening force by virtue of the camming action of the camming surface 423 is released, and can be displaced back to the untightened position successfully. Thus, the first and second lugs 123, 124 will not easily become fatigue after prolonged use.

Figure 6:
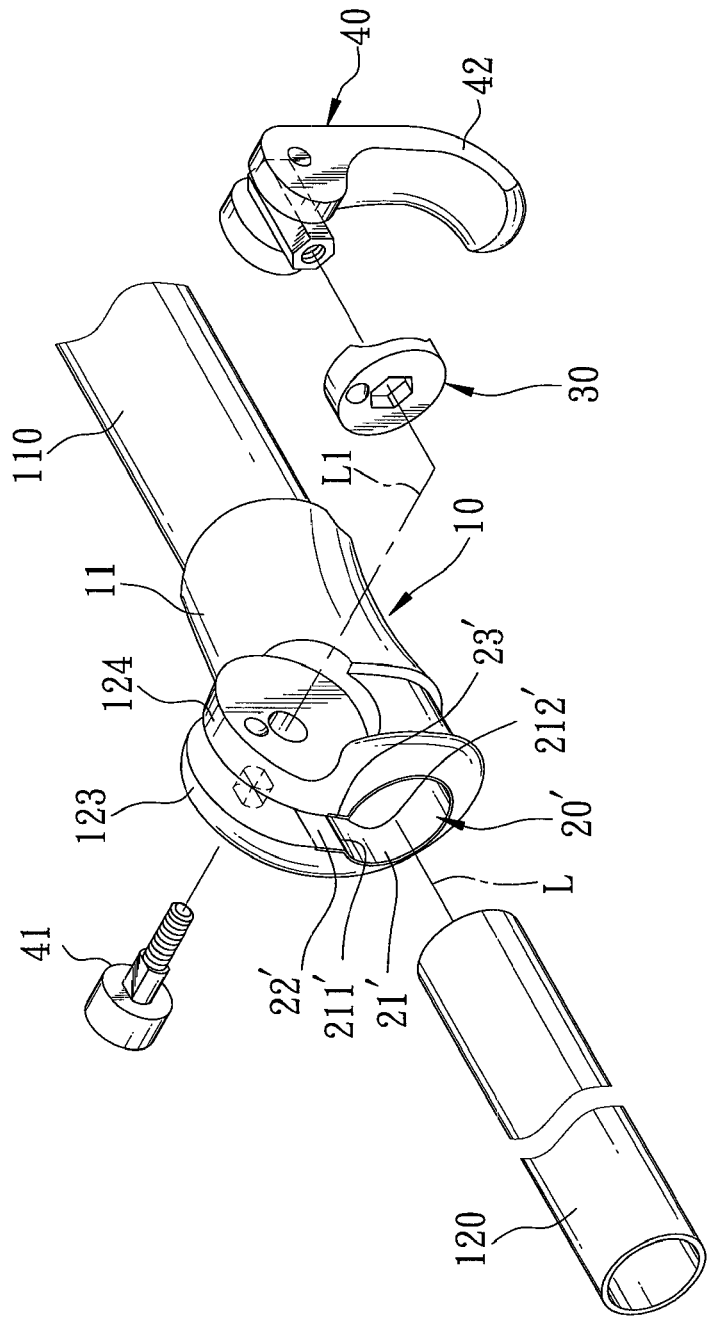
FIG. 6 is an exploded perspective view of a second embodiment of a clamping device according to this invention.
Figure 7:
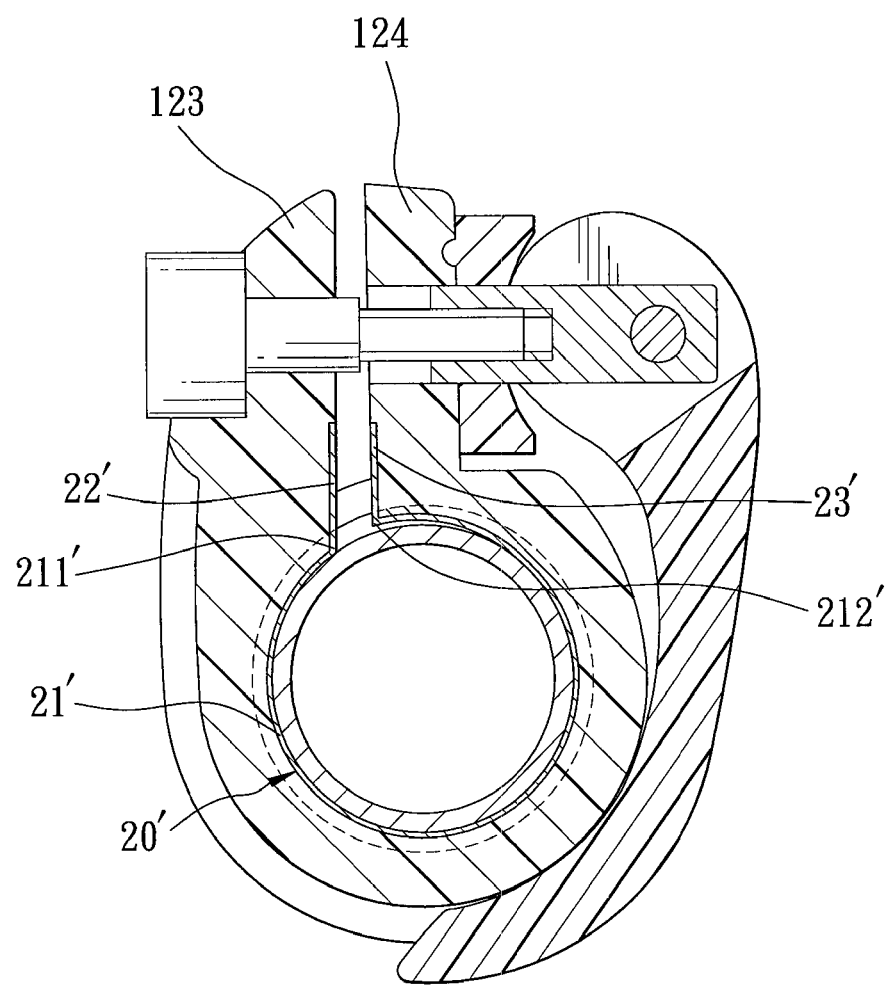
FIG. 7 is a sectional view of the second embodiment in a tightened state.

Referring to FIGS. 6 and 7, a second embodiment of the clamping device according to this invention is similar to the first embodiment, except that the elastic lining member 20' further has two reinforcing segments 22',23' which extend respectively from the end edges 211', 212' and which are respectively disposed on the first and second lugs 123, 124 such that a biasing force applied to the first and second lugs 123, 124 can be further enhanced.

Figure 8:
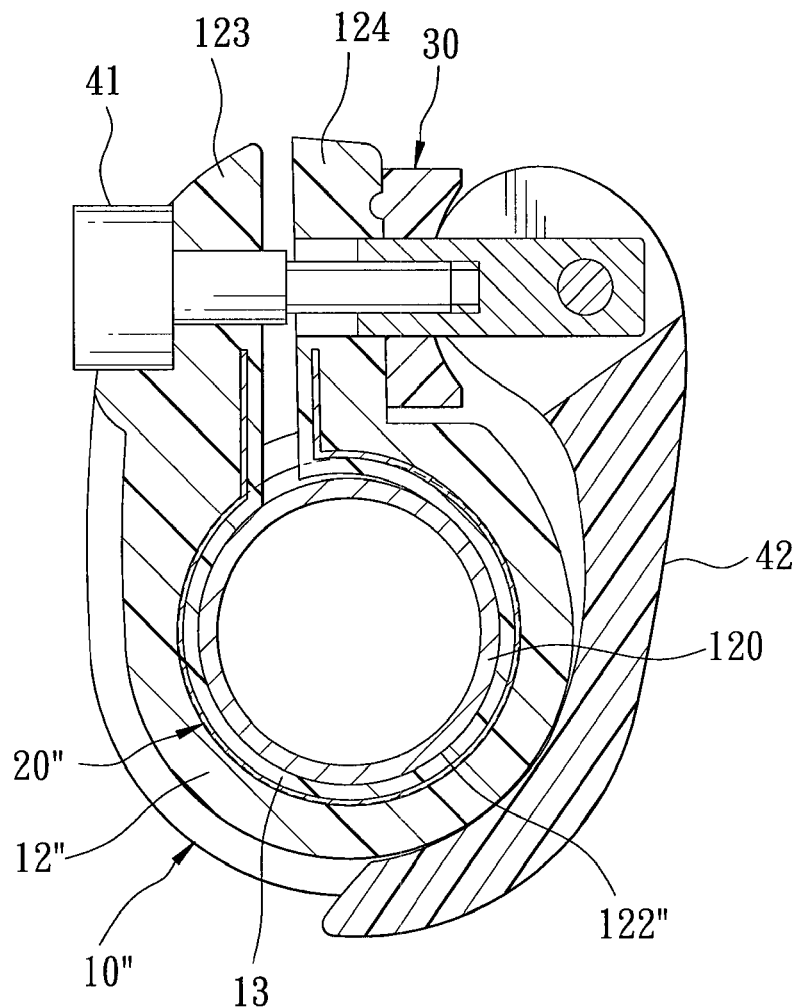
FIG. 8 is a sectional view of a third embodiment of a clamping device according to this invention.

Referring to FIG. 8, in a third embodiment of the clamping device, the collar 12" of the flexible sleeve 10" has a protective layer 13 which extends from the grasping surface 122" to cover the entire breadth of the elastic lining member 20" to thereby prevent the elastic lining member 20" from direct contact with the joint end of the inner segment 120. Specifically, the elastic lining member 20" is engaged in the flexible sleeve 10" to be spaced apart from the grasp surface 122" by the protective layer 13.

Figure 9:
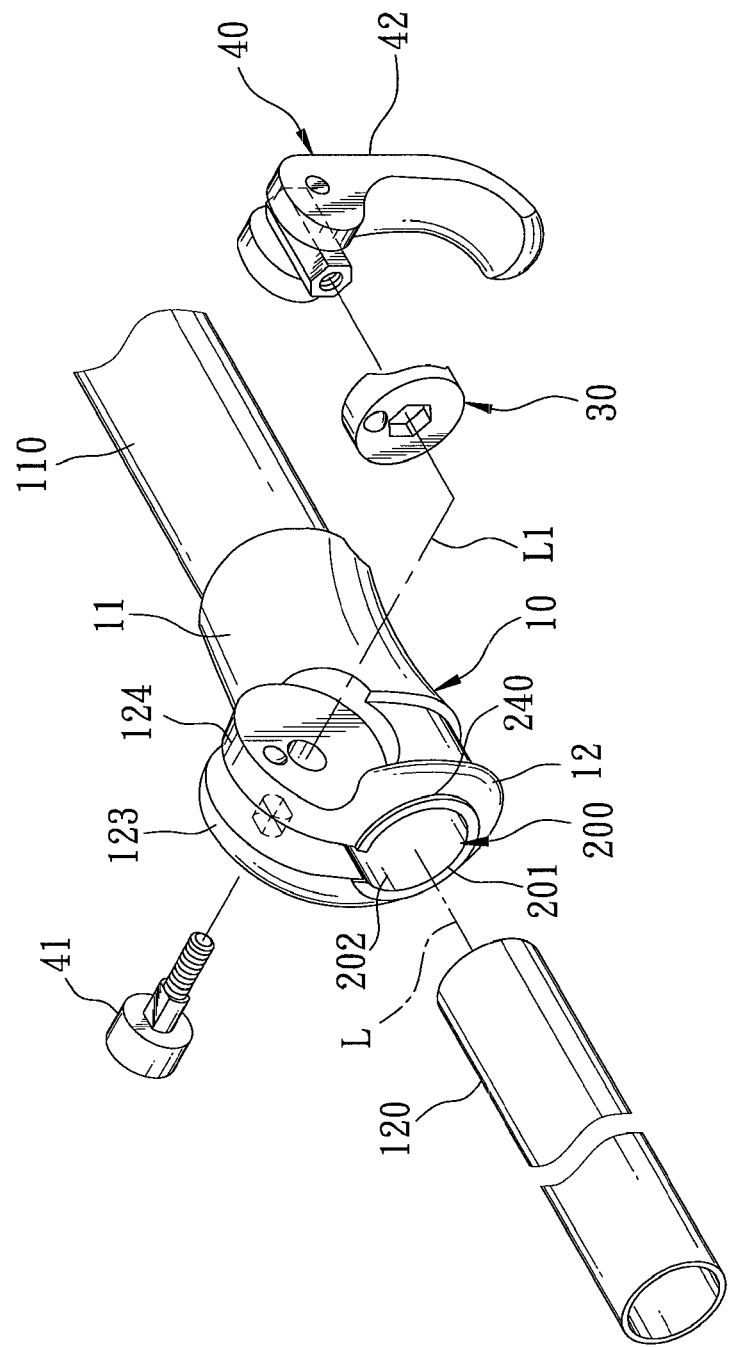
FIG. 9 is an exploded perspective view of a fourth embodiment of a clamping device according to this invention.

Referring to FIG. 9, in a fourth embodiment of the clamping device, the elastic lining member 200 further has a circumferentially extending flange 240 which extends radially from outer end edges of the base lining segment 201 and the curved flanking segments 202 and which is in abutting engagement with an outer end edge of the collar 12 opposite to the mount portion 11 so as to prevent axial movement of the elastic lining member 200 along the longitudinal axis (L). Hence, the elastic lining member 200 can be press-fitted in the axially extending bore 121 of the collar 12.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A clamping device for a telescopic rod which includes outer and inner segments respectively having joint ends telescopically joined to each other along a longitudinal axis, said clamping device comprising:

a flexible sleeve adapted to be secured on the joint end of the outer segment, and having a collar which has a grasping surface that circumscribes an axially extending bore along the longitudinal axis for receiving the joint end of the inner segment, and which has a gap that extends axially and that is communicated with said axially extending bore to define two opposite side edges, and first and second lugs which respectively extend from said side edges in a first transverse direction relative to the longitudinal axis, and which are spaced apart from each other in a second transverse direction that is transverse to both the first transverse direction and the longitudinal axis, said first and second lugs being displaceable in the second transverse direction between untightened and tightened positions where said gap has larger and smaller clearances, respectively;

an elastic lining member made from a material with a higher elasticity than that of said collar, and having a base lining segment which is disposed on said collar and in intimate contact with said grasping surface, and which is diametrically opposite to said gap relative to the longitudinal axis, and two curved flanking segments which respectively and angularly extend from two lateral edges of said base lining segment about the longitudinal axis, and which are in intimate contact with said grasping surface such that, as a result of displacement of each of said first and second lugs from the untightened position to the tightened position, each of said curved flanking segments is strained so as to acquire a biasing force that biases each of said curved flanking segments back toward the untightened position; and a tightening unit having a bolt member which extends through said first and second lugs along a transverse axis in the second transverse direction, and a lever member which is pivotally connected to said bolt member about a hinge axis parallel to the longitudinal axis and which has a camming surface that is configured to be angularly displaced upon turning of said lever arm about the hinge axis so as to press said first lug to move toward said second lug by virtue of camming action of said camming surface, thereby displacing said first and second lugs to the tightened position.

2. The clamping device as claimed in claim 1, wherein said elastic lining member is made from a thin metal sheet which is curved to form as said curved flanking segments when being disposed on said collar.

3. The clamping device as claimed in claim 2, wherein said curved flanking segments extend angularly to terminate at two end edges, respectively, adjacent to said side edges, respectively.

4. The clamping device as claimed in claim 3, wherein said elastic lining member further has two reinforcing segments which extend respectively from said end edges and which are respectively disposed on said first and second lugs.

5. The clamping device as claimed in claim 4, wherein said collar has a protective layer which extends from said grasping surface to cover entire breadth of said elastic lining member to thereby prevent said elastic lining member from direct contact with the joint end of the inner segment.

6. The clamping device as claimed in claim 2, wherein said elastic lining member further has a circumferentially extending flange which extends radially from outer end edges of said base lining segment and said curved flanking segments and which is in abutting engagement with an outer end edge of said collar.

* * * * *